United States Patent
Blaney et al.

(10) Patent No.: US 10,883,426 B2
(45) Date of Patent: *Jan. 5, 2021

(54) PLANETARY GEAR SYSTEM FOR TURBOMACHINE

(71) Applicant: Raytheon Technologies Corporation, Farmington, CT (US)

(72) Inventors: Ken F. Blaney, Middleton, NH (US); Todd M. LaPierre, Middleton, NH (US); Richard K. Hayford, Cape Neddick, ME (US)

(73) Assignee: RAYTHEON TECHNOLOGIES CORPORATION, Waltham, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/730,466

(22) Filed: Dec. 30, 2019

(65) Prior Publication Data

US 2020/0182159 A1 Jun. 11, 2020

Related U.S. Application Data

(63) Continuation of application No. 15/688,251, filed on Aug. 28, 2017, now Pat. No. 10,519,872, which is a (Continued)

(51) Int. Cl.
*F16H 57/025* (2012.01)
*F02C 7/36* (2006.01)
(Continued)

(52) U.S. Cl.
CPC .............. *F02C 7/36* (2013.01); *F02C 3/107* (2013.01); *F02K 3/06* (2013.01); *F16H 1/46* (2013.01);
(Continued)

(58) Field of Classification Search
None
See application file for complete search history.

(56) References Cited

U.S. PATENT DOCUMENTS 3,675,510 A 7/1972 Duggar, Jr.
5,433,674 A * 7/1995 Sheridan ............... F16H 1/2809
475/346

(Continued)

FOREIGN PATENT DOCUMENTS

EP 1028275 A2 8/2000
WO 2014182467 A1 11/2014

OTHER PUBLICATIONS

European Search Report for Application No. 15201414.8-1607; dated May 18, 2016; 8 pgs.

(Continued)

*Primary Examiner* — Justin Holmes
(74) *Attorney, Agent, or Firm* — Cantor Colburn LLP

(57) ABSTRACT

A planetary gear system for a turbomachine includes a forward planetary gear assembly including a plurality of forward planet gears meshed to a forward sun gear disposed on a power shaft and a forward ring gear meshed to the forward planet gears and an aft planetary gear assembly aft of the forward planetary assembly including a plurality of aft planet gears meshed to an aft sun gear disposed on the power shaft and an aft ring gear meshed to the aft planet gears. The system also includes a gear housing disposed between the forward planetary gear assembly and the aft planetary gear assembly. The gear housing includes a stationary carrier, wherein the forward and aft planet gears are rotatably mounted to the stationary carrier, and a mount extending radially from the stationary carrier that is connectable to a stationary portion of the turbomachine.

20 Claims, 4 Drawing Sheets

Related U.S. Application Data continuation of application No. 14/974,994, filed on Dec. 18, 2015, now Pat. No. 9,745,898.

(60) Provisional application No. 62/093,796, filed on Dec. 18, 2014.

(51) Int. Cl.
  *F02K 3/06* (2006.01)
  *F02C 3/107* (2006.01)
  *F16H 1/46* (2006.01)
  *F16H 57/028* (2012.01)

(52) U.S. Cl.
  CPC ......... *F16H 57/025* (2013.01); *F16H 57/028* (2013.01); *F05D 2260/40311* (2013.01); *Y02T 50/60* (2013.01)

(56) References Cited

U.S. PATENT DOCUMENTS

| | | |
|---|---|---|
| 6,148,605 A | 11/2000 | Lardellier |
| 6,223,616 B1 | 5/2001 | Sheridan |
| 8,402,742 B2 | 3/2013 | Roberge et al. |
| 9,745,898 B2 | 8/2017 | Blaney et al. |
| 10,519,872 B2* | 12/2019 | Blaney ............... F16H 57/028 |
| 2005/0090364 A1* | 4/2005 | Lee .................... B25F 5/001 |
| | | 475/331 |
| 2009/0145102 A1 | 6/2009 | Roberge et al. |
| 2010/0303626 A1* | 12/2010 | Mostafi ............... F16C 11/06 |
| | | 416/170 R |
| 2012/0045336 A1 | 2/2012 | Martinez |
| 2013/0023378 A1* | 1/2013 | McCune ............. F02C 3/107 |
| | | 475/344 |
| 2013/0102432 A1 | 4/2013 | Imai et al. |
| 2013/0225353 A1 | 8/2013 | Gallet et al. |
| 2014/0241856 A1 | 8/2014 | Roberge et al. |
| 2014/0309078 A1 | 10/2014 | Curti et al. |
| 2016/0177841 A1 | 6/2016 | Blaney et al. |
| 2017/0292454 A1* | 10/2017 | Currier ................. F02C 7/36 |
| 2018/0252165 A1 | 9/2018 | Blaney et al. |

OTHER PUBLICATIONS

EP Office Action for Application No. 19209855.6; dated Feb. 27, 2020.

* cited by examiner

PLANETARY GEAR SYSTEM FOR TURBOMACHINE

CROSS REFERENCE TO RELATED APPLICATIONS

This application is a continuation of U.S. patent Application Ser. No. 15/688,251 filed on Aug. 28, 2017, which is a continuation of U.S. patent application Ser. No. 14/974,994, filed on Dec. 18, 2015, which claims the benefit of U.S. Provisional Patent Application Ser. No. 62/093,796 filed on Dec. 18, 2014, the entire contents each of which are incorporated herein by reference thereto.

BACKGROUND

1. Field

The present disclosure relates to turbomachine gearing systems, more specifically to planetary gear boxes for turbomachines.

2. Description of Related Art

Planetary gears for gearing the fan of a turbomachine include a pair of helical rings gears connected together to form a herring-bone gear. A sun gear is connected to the low pressure compressor (LPC) shaft on its inner diameter and to a plurality of stationary planet gears on its outer diameter. The planet gears engage an inner diameter of the helical ring gears to rotate the ring gears. The shaft of the fan is geared to the outer diameter helical ring gears. The LPC is connected to the LPC shaft to rotate which rotates in the same direction as the fan.

Such conventional methods and systems have generally been considered satisfactory for their intended purpose. However, there is still a need in the art for improved gearing systems for turbomachines that enhance efficiency of the turbomachine. The present disclosure provides a solution for this need.

SUMMARY

A planetary gear system for a turbomachine includes a forward planetary gear assembly including a plurality of forward planet gears meshed to a forward sun gear disposed on a power shaft and a forward ring gear meshed to the forward planet gears and an aft planetary gear assembly aft of the forward planetary assembly including a plurality of aft planet gears meshed to an aft sun gear disposed on the power shaft and an aft ring gear meshed to the aft planet gears. The system also includes a gear housing disposed between the forward planetary gear assembly and the aft planetary gear assembly. The gear housing includes a stationary carrier, wherein the forward and aft planet gears are rotatably mounted to the stationary carrier, and a mount extending radially from the stationary carrier that is connectable to a stationary portion of the turbomachine.

The mount can include a vibration damper. In certain embodiments, the mount can be shaped to act as a vibration damper. In certain embodiments, the mount can include a different material from that of the stationary carrier.

The forward planetary gear assembly can be connectable to a fan shaft and the aft planetary gear assembly can be connectable to a low pressure compressor shaft. The forward planetary gear assembly can have a different gear ratio from that of the aft planetary gear assembly. The different gear ratio between the first planetary gear assembly and the aft planetary gear assembly can be selected to tune a natural frequency. At least one of the forward ring gear or the aft ring gear can include a helical gear.

A turbomachine can include a planetary gear system as described above. For example, the forward ring gear can be connected to a fan shaft and the aft ring gear can be connected to a low pressure compressor shaft of the turbomachine. In certain embodiments, the forward planetary gear assembly can be connected to a low pressure compressor and the aft planetary gear assembly can be connected to a high pressure compressor shaft.

In at least one aspect of this disclosure, a planetary gear system for a turbomachine includes a forward planetary gear assembly including a plurality of forward planet gears meshed to a sun gear disposed on a power shaft and a forward ring gear meshed to the forward planet gears, an aft planetary gear assembly aft of the forward planetary assembly including a plurality of aft planet gears meshed to the same sun gear and an aft ring gear meshed to the aft planet gears, and a gear housing as describe above and disposed between the forward planetary gear assembly and the aft planetary gear assembly.

In one embodiment, a planetary gear system for a turbomachine is provided. The planetary gear system having: a forward planetary gear assembly including a plurality of forward planet gears meshed to a forward sun gear disposed on a power shaft and a forward ring gear meshed to the forward planet gears; an aft planetary gear assembly aft of the forward planetary gear assembly including a plurality of aft planet gears meshed to an aft sun gear disposed on the power shaft and an aft ring gear meshed to the aft planet gears; and a gear housing disposed between the forward planetary gear assembly and the aft planetary gear assembly, wherein the gear housing includes: a stationary carrier, wherein the forward and aft planet gears are rotatably mounted to the stationary carrier; and a mount extending radially from the stationary carrier that is connectable to a stationary portion of the turbomachine.

In addition to one or more of the features described above, or as an alternative to any of the foregoing embodiments, the mount includes a vibration damper.

In addition to one or more of the features described above, or as an alternative to any of the foregoing embodiments, the mount is shaped to act as a vibration damper.

In addition to one or more of the features described above, or as an alternative to any of the foregoing embodiments, the mount includes a different material from that of the stationary carrier.

In addition to one or more of the features described above, or as an alternative to any of the foregoing embodiments, the forward planetary gear assembly is connectable to a fan shaft and wherein the aft planetary gear assembly is connectable to a low pressure compressor shaft.

In addition to one or more of the features described above, or as an alternative to any of the foregoing embodiments, the forward planetary gear assembly has a different gear ratio from that of the aft planetary gear assembly.

In addition to one or more of the features described above, or as an alternative to any of the foregoing embodiments, at least one of the forward ring gear or the aft ring gear includes a helical gear.

In yet another embodiment, a turbomachine is provided. The turbomachine having: a planetary gear system including: a forward planetary gear assembly including a plurality of forward planet gears meshed to a forward sun gear disposed on a power shaft and a forward ring gear meshed to the forward planet gears; an aft planetary gear assembly aft of the forward planetary assembly including a plurality of aft planet gears meshed to an aft sun gear disposed on the power shaft and an aft ring gear meshed to the aft planet gears; and a gear housing disposed between the forward planetary gear assembly and the aft planetary gear assembly, wherein the gear housing includes: a stationary carrier, wherein the forward and aft planet gears are rotatably mounted to the stationary carrier; and a mount extending radially from the stationary carrier that is connectable to a stationary portion of the turbomachine.

In addition to one or more of the features described above, or as an alternative to any of the foregoing embodiments, the mount includes a vibration damper.

In addition to one or more of the features described above, or as an alternative to any of the foregoing embodiments, the mount is shaped to act as a vibration damper.

In addition to one or more of the features described above, or as an alternative to any of the foregoing embodiments, the mount includes a different material from that of the stationary carrier.

In addition to one or more of the features described above, or as an alternative to any of the foregoing embodiments, the forward ring gear is connected to a fan shaft and wherein the aft ring gear is connected to a low pressure compressor shaft.

In addition to one or more of the features described above, or as an alternative to any of the foregoing embodiments, the forward planetary gear assembly has a different gear ratio from that of the aft planetary gear assembly.

In addition to one or more of the features described above, or as an alternative to any of the foregoing embodiments, the different gear ratio between the first planetary gear assembly and the aft planetary gear assembly is selected to tune a natural frequency.

In addition to one or more of the features described above, or as an alternative to any of the foregoing embodiments, at least one of the forward ring gear or the aft ring gear includes a helical gear.

In addition to one or more of the features described above, or as an alternative to any of the foregoing embodiments, the forward planetary gear assembly is connected to a low pressure compressor and the aft planetary gear assembly is connected to a high pressure compressor shaft.

In yet another embodiment, a gear housing for planetary gears of a turbomachine is provided. The gear housing having: a stationary carrier that is disposable between a forward planet gear assembly and an aft planet gears assembly such that forward planet gears and aft planet gears are rotatably mountable to the stationary carrier; and a mount extending radially from the stationary carrier that is connectable to a stationary portion of the turbomachine.

In addition to one or more of the features described above, or as an alternative to any of the foregoing embodiments, the mount includes a vibration damper.

In addition to one or more of the features described above, or as an alternative to any of the foregoing embodiments, the mount is shaped to act as a vibration damper.

In yet another embodiment, a planetary gear system for a turbomachine is provided. The planetary gear system having: a forward planetary gear assembly including a plurality of forward planet gears meshed to a sun gear disposed on a power shaft and a forward ring gear meshed to the forward planet gears; an aft planetary gear assembly aft of the forward planetary assembly including a plurality of aft planet gears meshed to the same sun gear and an aft ring gear meshed to the aft planet gears; and a gear housing disposed between the forward planetary gear assembly and the aft planetary gear assembly, wherein the gear housing includes: a stationary carrier, wherein the forward and aft planet gears are rotatably mounted to the stationary carrier; and a mount extending radially from the stationary carrier that is connectable to a stationary portion of the turbomachine.

In yet another embodiment, a planetary gear assembly for a turbomachine is provided. The planetary gear assembly including a plurality of planet gears meshed to a sun gear disposed on a power shaft, a forward ring gear meshed to the planet gears and an aft ring gear meshed to the planet gears; and a gear housing disposed around the planetary gear assembly, wherein the gear housing includes: a stationary carrier, wherein the planet gears are rotatably mounted to the stationary carrier; and a mount extending radially from the stationary carrier between the forward and aft ring gears that is connectable to a stationary portion of the turbomachine.

These and other features of the systems and methods of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION

Figure 1A:
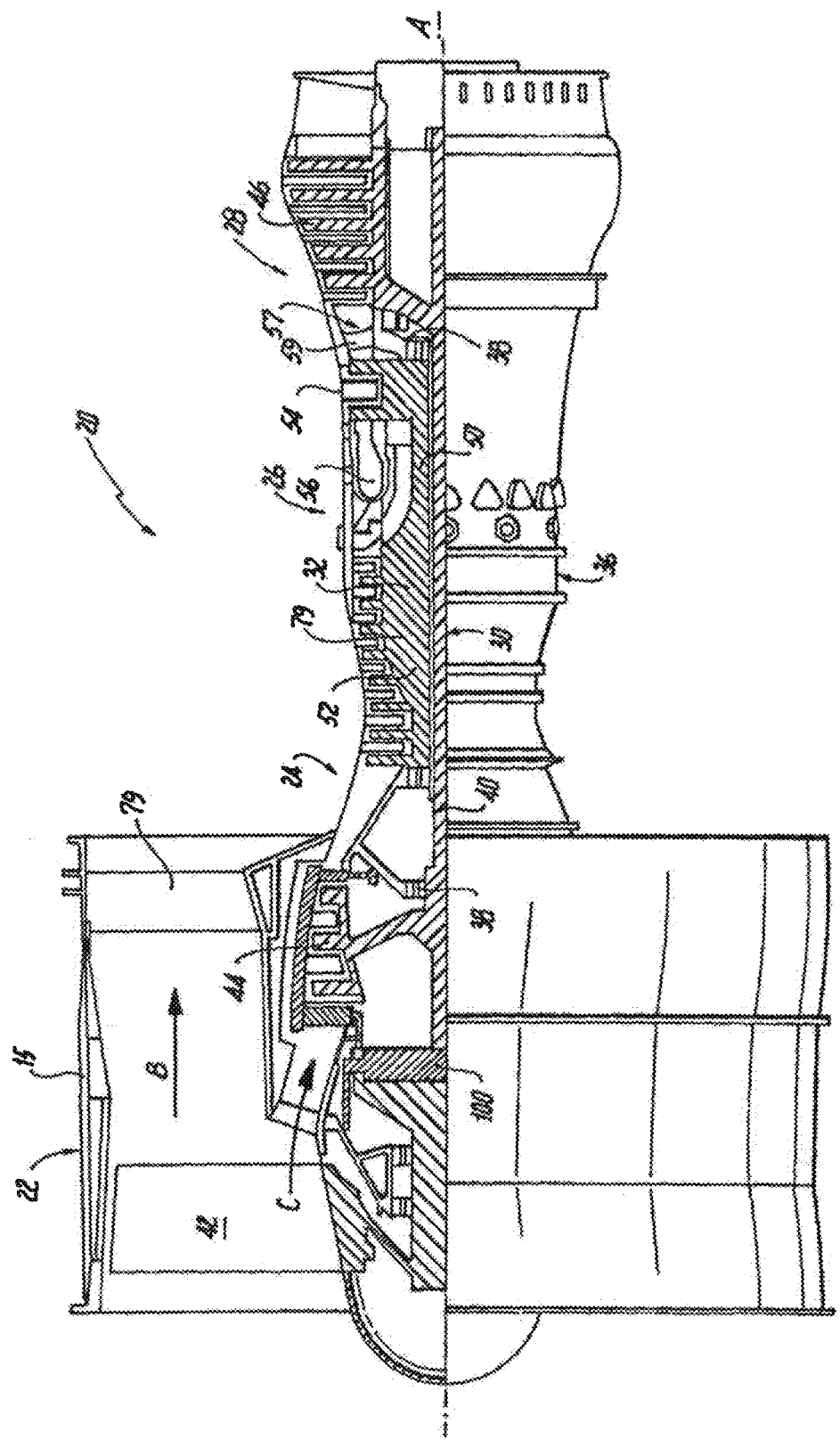
FIG. 1A is a schematic, partial cross-sectional view of a turbomachine in accordance with this disclosure.

Reference will now be made to the drawings wherein like reference numerals identify similar structural features or aspects of the subject disclosure. For purposes of explanation and illustration, and not limitation, an illustrative view of an embodiment of a turbomachine in accordance with the disclosure is shown in FIG. 1A and is designated generally by reference character 20. The systems and methods described herein can be used to increase the efficiency and fuel economy of turbomachines.

FIG. 1A schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a gear system 100 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan gear system 100 may be varied. For example, gear system 100 may be located aft of combustor section 26 or even aft of turbine section 28, and fan section 22 may be positioned forward or aft of the location of gear system 100.

The engine 20 in one example is a high-bypass geared aircraft engine. In a further example, the engine 20 bypass ratio is greater than about six (6), with an example embodiment being greater than about ten (10), the geared architecture is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture may be an epicycle gear train, such as a planetary gear system or other gear system, with a gear reduction ratio of greater than about 2.3:1. It should be understood, however, that the above parameters are only exemplary of one embodiment of a geared architecture engine and that the present disclosure is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane 79 ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(\text{Tram }° R)/(518.7 ° R)]^{0.5}$. The "Low corrected fan tip speed" as disclosed herein according to one non-limiting embodiment is less than about 1150 ft/second (350.5 meters/second).

Figure 1B:
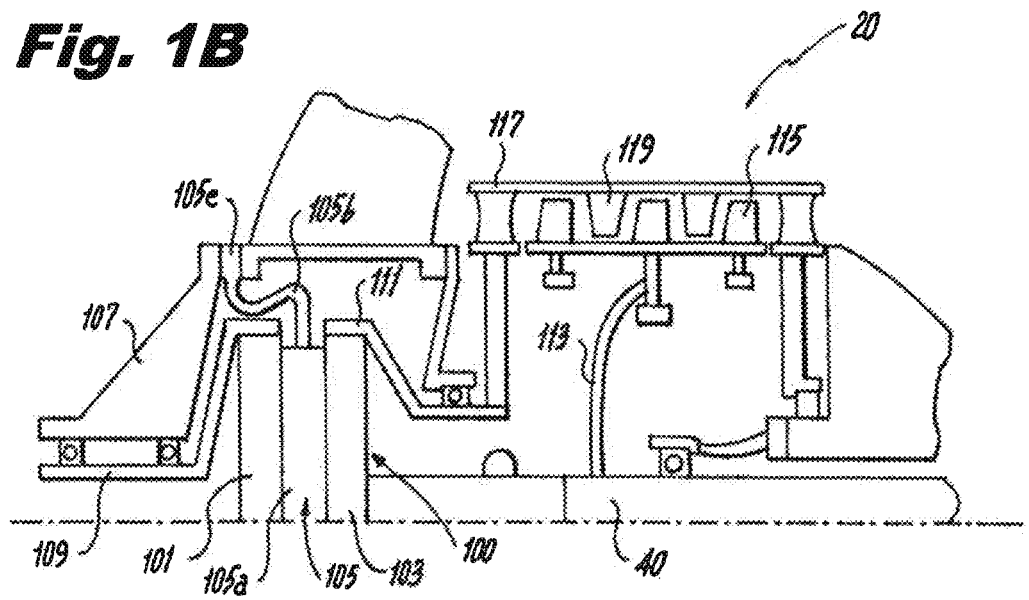
FIG. 1B is a partial schematic cross-sectional view of a portion of the turbomachine of FIG. 1A, showing an embodiment of a planetary gear system disposed therein and operatively connected to a fan and a the low pressure compressor.
Figure 1C:
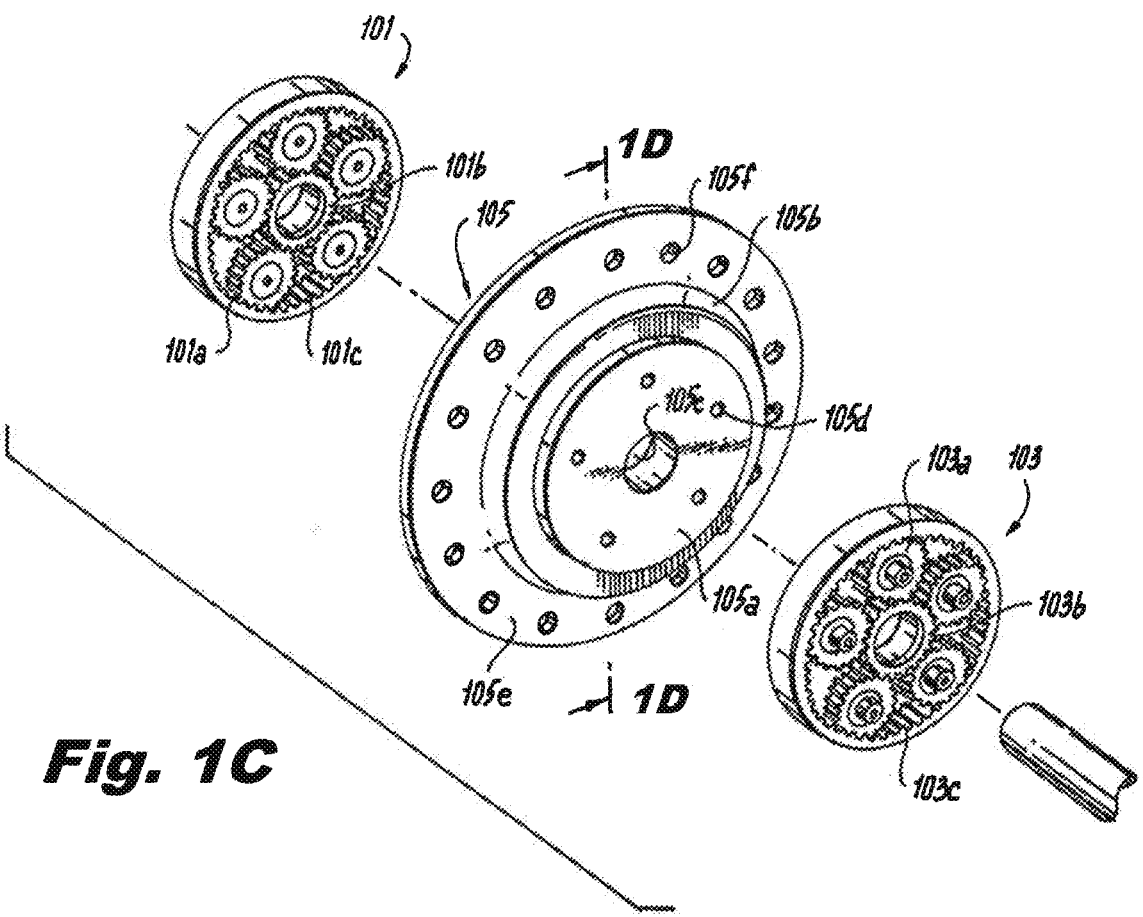
FIG. 1C is an exploded view the planetary gear system of FIG. 1B.

Referring to FIGS. 1B and 1C, a gear system 100 for a turbomachine includes a forward planetary gear assembly 101 including a plurality of forward planet gears 101a meshed to a forward sun gear 101b that is configured to be disposed on a power shaft (e.g., inner shaft 40) and a forward ring gear 101c meshed to the forward planet gears 101a on an inner circumference thereof.

The system 100 also includes an aft planetary gear assembly 103 disposed aft of the forward planetary assembly 101. The aft planetary gear assembly 103 includes a plurality of aft planet gears 103a meshed to an aft sun gear 103b configured to be disposed on a power shaft (e.g., inner shaft 40) and an aft ring gear 103c which is meshed to the aft planet gears 103b. It is contemplated that at least one of the forward ring gear 101c or the aft ring gear 103c can include a helical gear defined by helical gear teeth disposed thereon. While sun gears 101b and 103b are shown as separate gears, it is contemplated herein that a single sun gear can be utilized that meshes with both sets of planetary gears 101a, 103a.

Figure 1D:
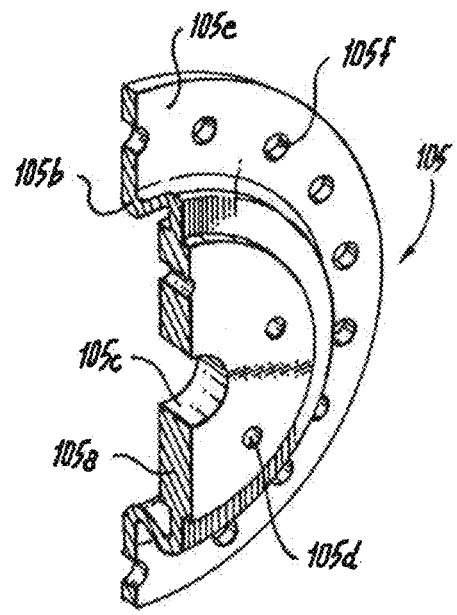
FIG. 1D is a cross-sectional perspective view of an embodiment of a gear housing in accordance with this disclosure.

Referring additionally to FIGS. 1D, the system 100 includes a gear housing 105 disposed between the forward planetary gear assembly 101 and the aft planetary gear assembly 103. The gear housing 105 includes a stationary carrier 105a and a mount 105b extending radially from the stationary carrier 105a. The stationary carrier 105a of mount 105 can include a plurality of connection features (e.g., holes 105d) to allow the planetary gears 101a, 103a to be rotatably mounted to the stationary carrier 105a in any suitable manner (e.g., via bolts and bearings). The stationary carrier 105a also includes a central passage 105c to allow the power shaft (e.g., inner shaft 40) to pass therethrough.

The mount 105b can be connectable to a stationary portion 107 of the turbomachine 20 at a flange portion 105e. As shown, flange portion 105e can include a plurality of connection features (e.g., flange holes 105f) that can be mounted to the stationary portion via any suitable means (e.g., bolts, pins).

In certain embodiments, the mount 105b can include a vibration damper operatively connected thereto in any suitable manner. However, as shown, the mount 105b can be shaped to act as a vibration damper. In certain embodiments, the mount 105b can include a different material from that of the stationary carrier 105a to absorb vibrations and/or reduce weight of the housing 105.

As shown in FIG. 1B, the forward planetary gear 101 assembly can be connected to a fan shaft 109 and the aft planetary gear assembly 103 can be connectable to a low pressure compressor (LPC) shaft 111. Such an arrangement allows the gear system 100 to produce two outputs (e.g., one for the fan shaft 109 and one for the LPC shaft 111). It is contemplated that the forward planetary gear assembly 101 can have a different gear ratio from that of the aft planetary gear assembly 103 to rotate the LPC shaft 111 at a different speed than the fan shaft 109. In certain embodiments, the gear ratio between the first planetary gear assembly 103 and the aft planetary gear assembly 103 can be selected to tune the natural frequency between the fan and compressor (and/or any other suitable outputs).

A low pressure compressor inner spool 113 can be coupled to the inner shaft 40 which causes rotation of blades 115 in the angular direction of the shaft 40 as the rotational speed of the shaft. The LPC shaft 111 can be connected to an outer LPC spool 117 having counter-blades 119 mounted thereto. Due to the gearing relationship in the planetary gear assemblies 101, 103, the ring gears 101c, 103c, LPC shaft 111, and the outer LPC spool 117 rotate in the direction opposite of the inner shaft 40. This results in counter rotation of the blades 117 and counter-blades 119, effectively increasing the RPM of the LPC thereby causing greater compression.

Figure 2:
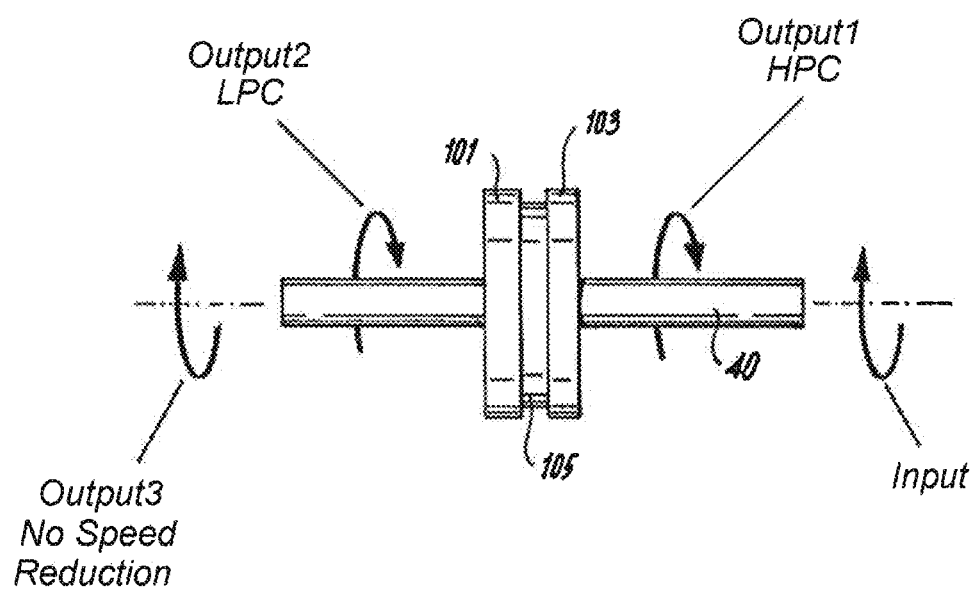
FIG. 2 is a schematic view of an embodiment of a planetary gear system in accordance with this disclosure, shown disposed on a shaft for connection to a low pressure compressor and a high pressure compressor.

Referring to FIG. 2, another use of the gear system 100 is schematically depicted. As shown, in certain embodiments, the forward planetary gear assembly 101 can be connected to a low pressure compressor shaft and the aft planetary gear assembly 103 can be connected to a high pressure compressor shaft to counter rotate both the high pressure compressor and the low pressure compressor as described above. As shown, the inner shaft 40 can connect directly to the fan shaft 109 or to another gearbox for reducing fan speed.

Figure 3:
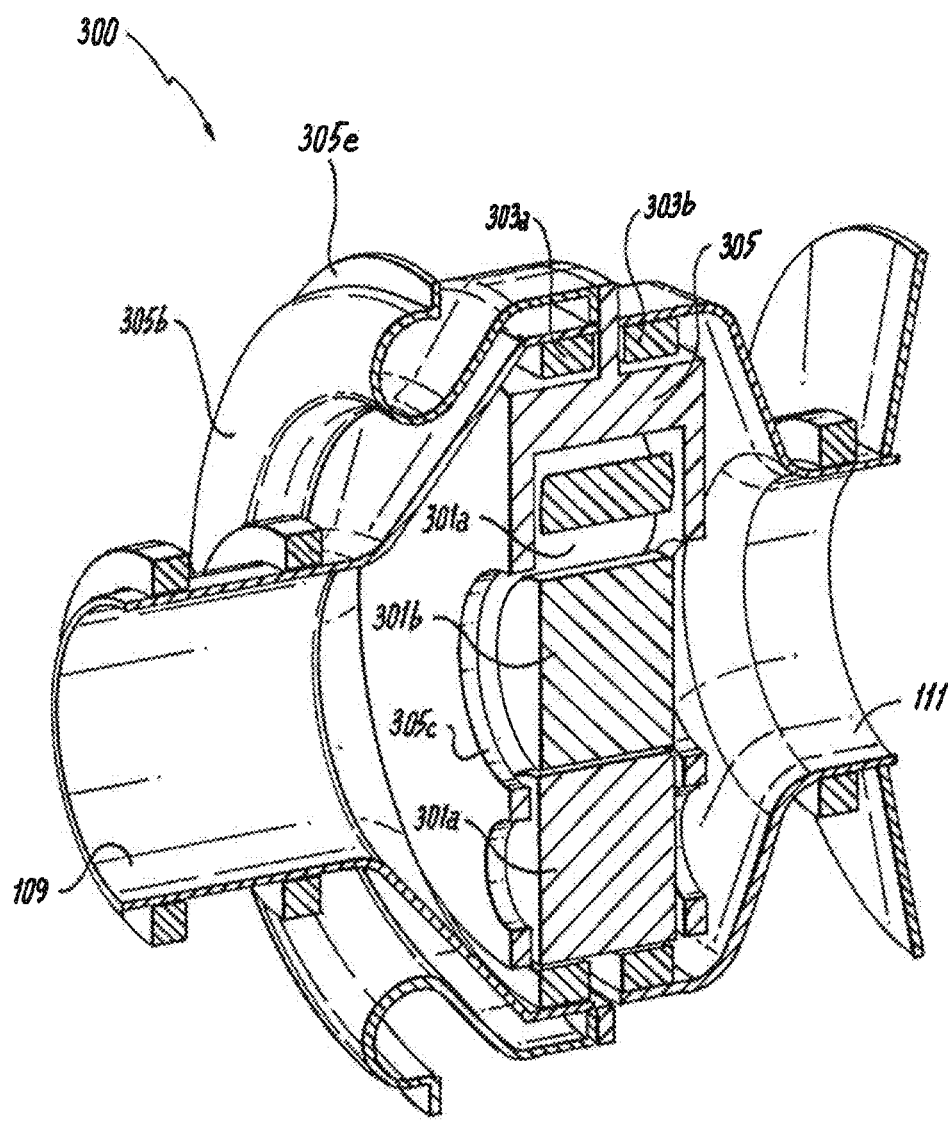
FIG. 3 is a schematic cutaway of an embodiment of a planetary gear system in accordance with this disclosure.

Referring to FIG. 3, an embodiment of a gear system 300 is shown schematically. System 300 includes a gear housing 305 having a central passage 305c similar to central passage 105c as described above and a mount 305b similar to mount 105b as described above. Mount 305b includes a flange portion 305e connected thereto similar in function to flange portion 105e as described above.

Gear system 300 differs from gear system 100 in that it includes a single set of planetary gears 301a and sun gear 301b which mesh with both ring gears 303a and 303b through the housing 305 for two separate outputs as described above. As shown, the housing 305 also can be configured to surround the planetary gears 301a and/or the sun gear 301b in such a configuration. In certain embodiments, the housing 305 can seal the lateral sides of the planetary gears 301a and/or the sun gear 301b allowing oil to be retained therein.

While the gear systems 100, 300 is described herein as being applied to compressor sections of a turbomachine, it is contemplated that gear system 100 can be applied to any suitable portion of a turbomachine (e.g., high pressure and low pressure turbine sections).

As disclosed above, the gear system 100 can allow for more than one outputs from a single gearbox without adding extra gears and an excessive amount of weight. While overall performance in compression is enhanced by maintaining conventional amounts of stages, it is contemplated that the rotor dynamics of the turbomachine 20 can be improved by having the ability to shorten a rotor (e.g., from the HPC) and reducing stages since compression is more efficient.

While the LPC has a larger diameter than the HPC, the LPC can use lighter materials due to the reduced temperatures and pressures it is exposed to. Therefore, biasing more of the work to the LPC by counter rotating the LPC saves weight. In addition the rotating case (e.g., the outer LPC spool 117 described above) can be of lighter construction than traditional LPC cases since it will not take on the structural loads of the turbomachine like a conventional LPC case does. Those structural loads can be be transferred to the case outboard of the LPC case.

The methods and systems of the present disclosure, as described above and shown in the drawings, provide for a turbomachine with superior properties including enhanced compression efficiency. While the apparatus and methods of the subject disclosure have been shown and described with reference to embodiments, those skilled in the art will readily appreciate that changes and/or modifications may be made thereto without departing from the scope of the subject disclosure.

What is claimed is:

1. A gear housing for planetary gears of a turbomachine, comprising:
    a stationary carrier that is disposable between a forward planetary gear assembly and an aft planetary gear assembly such that forward planet gears of the forward planetary gear assembly and aft planet gears of the aft planetary gear assembly are each rotatably mountable to the stationary carrier; and
    a mount extending radially from the stationary carrier that is connectable to a stationary portion of the turbomachine, wherein the mount is formed from a different material that the stationary carrier.

2. The gear housing of claim 1, wherein the mount includes a vibration damper.

3. The gear housing of claim 1, wherein the mount is shaped to act as a vibration damper.

4. The gear housing of claim 1, wherein a gear ratio of the forward planetary gear assembly is different from a gear ratio of the aft planetary gear assembly.

5. The gear housing of claim 1, wherein the forward planetary gear assembly is connected to a fan shaft and the aft planetary gear assembly is connected to a low pressure compressor shaft.

6. The gear housing of claim 1, wherein the forward planetary gear assembly is connected to a low pressure compressor shaft and the aft planetary gear assembly is connected to a high pressure compressor shaft.

7. A planetary gear system for a turbomachine, comprising:
    a forward planetary gear assembly including a plurality of forward planet gears meshed to a sun gear disposed on a power shaft and a forward ring gear meshed to the forward planet gears;
    an aft planetary gear assembly aft of the forward planetary assembly including a plurality of aft planet gears meshed to the sun gear and an aft ring gear meshed to the aft planet gears; and
    a gear housing disposed between the forward planetary gear assembly and the aft planetary gear assembly, wherein the gear housing includes:
        a stationary carrier, wherein the plurality of forward planet gears and the plurality of aft planet gears are each rotatably mounted to the stationary carrier; and a mount extending radially from the stationary carrier that is connectable to a stationary portion of the turbomachine, wherein the mount is formed from a different material that the stationary carrier.

8. The planetary gear system of claim 7, wherein the mount includes a vibration damper.

9. The planetary gear system of claim 7, wherein the mount is shaped to act as a vibration damper.

10. The planetary gear system of claim 7, wherein a gear ratio of the forward planetary gear assembly is different from a gear ratio of the aft planetary gear assembly.

11. The planetary gear system of claim 7, wherein the forward planetary gear assembly is connected to a fan shaft and the aft planetary gear assembly is connected to a low pressure compressor shaft.

12. The planetary gear system of claim 11, wherein a gear ratio of the forward planetary gear assembly is different from a gear ratio of the aft planetary gear assembly.

13. The planetary gear system of claim 7, wherein the forward planetary gear assembly is connected to a low pressure compressor shaft and the aft planetary gear assembly is connected to a high pressure compressor shaft.

14. A gas turbine engine, comprising:
a fan section;
a compressor section;
a combustor section;
a turbine section; and
a planetary gear system, comprising:
a forward planetary gear assembly including a plurality of forward planet gears meshed to a sun gear disposed on a power shaft and a forward ring gear meshed to the forward planet gears;
an aft planetary gear assembly aft of the forward planetary assembly including a plurality of aft planet gears meshed to the sun gear and an aft ring gear meshed to the aft planet gears; and
a gear housing disposed between the forward planetary gear assembly and the aft planetary gear assembly, wherein the gear housing includes:
a stationary carrier, wherein the plurality of forward planet gears and the plurality of aft planet gears are each rotatably mounted to the stationary carrier; and
a mount extending radially from the stationary carrier that is connectable to a stationary portion of the turbomachine, wherein the mount is formed from a different material that the stationary carrier.

15. The gas turbine engine of claim 14, wherein the mount includes a vibration damper.

16. The gas turbine engine of claim 14, wherein the mount is shaped to act as a vibration damper.

17. The gas turbine engine of claim 14, wherein a gear ratio of the forward planetary gear assembly is different from a gear ratio of the aft planetary gear assembly.

18. The gas turbine engine of claim 14, wherein the forward planetary gear assembly is connected to a fan shaft of the fan section and the aft planetary gear assembly is connected to a low pressure compressor shaft of the compressor section.

19. The gas turbine engine of claim 14, wherein the forward planetary gear assembly is connected to a low pressure compressor shaft of the compressor section and the aft planetary gear assembly is connected to a high pressure compressor shaft of the compressor section.

20. The gas turbine engine of claim 14, wherein a gear ratio between the forward planetary gear assembly and the aft planetary gear assembly are configured to tune a natural frequency between a fan of the fan section and a compressor of the compressor section.

* * * * *